(12) United States Patent
Easwar et al.

(10) Patent No.: US 6,744,533 B1
(45) Date of Patent: Jun. 1, 2004

(54) EFFICIENT BUFFER RENDERING

(75) Inventors: Venkat V. Easwar, Campbell, CA (US); Fred J. Reuter, Plano, TX (US); Ralph Payne, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/392,137

(22) Filed: Sep. 8, 1999

Related U.S. Application Data

(60) Provisional application No. 60/100,543, filed on Sep. 16, 1998.

(51) Int. Cl.[7] .............................................. G06F 15/00
(52) U.S. Cl. ....................... 358/1.9; 345/563; 358/1.16
(58) Field of Search ................................ 345/191, 619, 345/553, 26, 563; 358/1.9, 1.16, 3.2, 1.11, 1.15; 382/180, 164; 710/113

(56) References Cited

U.S. PATENT DOCUMENTS 5,267,054 A * 11/1993 Chang et al. ................ 358/3.2
5,708,763 A * 1/1998 Peltzer ....................... 358/1.16
5,977,960 A * 11/1999 Nally et al. ................. 345/191
5,978,553 A * 11/1999 Ikeda .......................... 358/1.9

OTHER PUBLICATIONS

Russ, The Image Processing Handbook, 1998, CRC Press LLC, 3rd ed, Chapter 7, pp. 433, 438–439.*

* cited by examiner

Primary Examiner—Matthew C. Bella
Assistant Examiner—Dalip K. Singh
(74) Attorney, Agent, or Firm—Charles A. Brill; Wade James Brady, III; Frederick J. Telecky, Jr.

(57) ABSTRACT

A method and system for efficient buffer rendering. An object mask, typically a character font mask, is aligned with a memory tiling arrangement (1102). A tile map is generated (1104) to indicate active tiles. An active tile is selected (1106) and the portion of the buffer corresponding to the active tile is transferred (1108) from a first memory, typically an off-chip memory, to a second memory, typically an on-chip memory to allow a processor to render the band buffer tile. The portion of the band buffer is rendered (1110) and returned (1112) to the first memory. The next active tile is selected and the process continues until all active tiles have been rendered (1114).

5 Claims, 8 Drawing Sheets

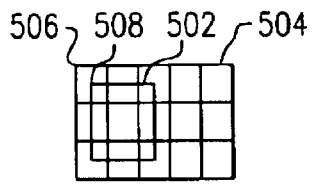
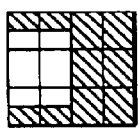
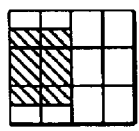
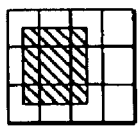
FIG. 5a  FIG. 5b  FIG. 5c  FIG. 5d
FIG. 6

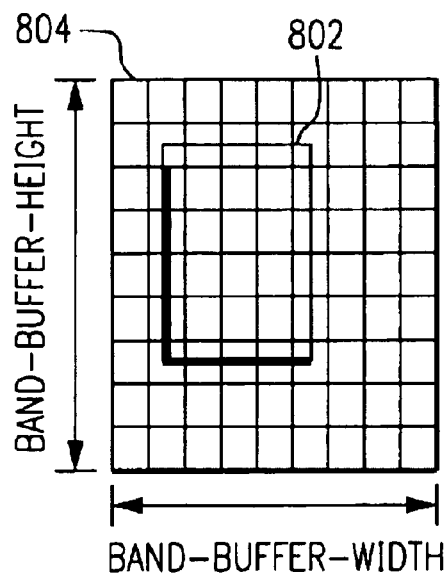
FIG. 7
FIG. 8a
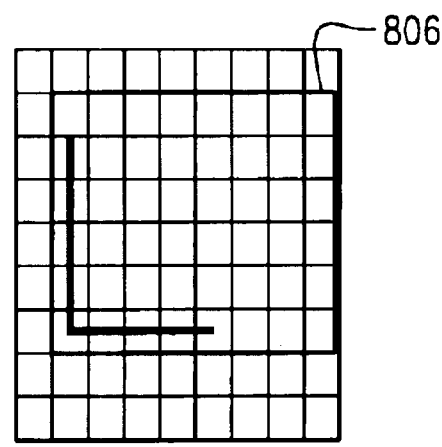
FIG. 8b
FIG. 8c

US 6,744,533 B1

EFFICIENT BUFFER RENDERING

This application claims priority under 35 USC §119(e)(1) of provisional application No. 60/100,543 filed Sep. 16, 1998.

FIELD OF THE INVENTION

This invention relates to the field of systems for compiling images, more particularly systems that compile an image by merging additional images into an image buffer containing additional image information.

BACKGROUND OF THE INVENTION

The advent of cost effective electronic computers has dramatically changed the printing industry. While just a few years ago printers relied on set type and photographic images, modem printers utilize streams of electronic information to describe the images to be formed. These streams of information typically convey information at a very high level in order to allow compatibility among a large range of printers. Modern page description languages are examples of the high level at which data is exchanged between the computer defining the image to be created and the printer creating the image.

While high level data is exchanged between the printer and the attached computer, this data must eventually be converted to some type of pixelated format or bitmap. A bitmap is a memory array that represents each location, or pixel, of the image or document to be printed. Each storage location in the bitmap corresponds to a specific portion of the image to be created. The data stored at the bitmap location, which may be a single bit or a digital word, determines the intensity and color of the image at that location. Multicolor images, or continuous tone images several bits to represent each pixel and are sometimes stored as a multiple arrays where each array is a separate bit-plane. A bit-plane consists of equally weighted bits from the entire bitmap.

Converting these image streams into an image bitmap requires each object described by the page description language to be merged into the image bitmap. This repetitive merging process, while relatively simple, consumes a very large amount of processing throughput—especially at the speeds consumers has come to demand. Although modern data processors have made great advances in throughput, the processing hardware drives up the cost of the printers. Efficient software, however, often lowers the recurring production costs by minimizing the processing power and memory included in the design. Therefore, there is a need in the industry for methods and systems that speed this merging process.

SUMMARY OF THE INVENTION

Objects and advantages will be obvious, and will in part appear hereinafter and will be accomplished by the present invention which provides a method and system for efficiently rendering a buffer. According to one embodiment of the claimed invention, a method is provided to render the buffer. The method comprises providing a band buffer stored in a first memory, providing an object mask, aligning the object mask with a predetermined tile grid, subdividing the object mask into tiles, locating active tiles in the object mask, transferring a portion of the band buffer corresponding to the active tiles into a second memory, modifying the portion of the band buffer based on a portion of the object mask corresponding with the portion of the band buffer, and returning the modified portion of the band buffer to the first memory.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a matrix representing a small portion of a print buffer or band buffer where each pixel of the buffer is represented by a single square holding a background image characteristic, in this case represented by the number "3."

FIG. 2 is a matrix representing a simple character mask for the letter "H" where the areas to receive the foreground color or other image characteristic are indicated by a "1."

FIG. 3 is a matrix showing the result of a rendering operation in which the character mask of FIG. 2 is used to render a foreground image characteristic, represented in this case by a "2," onto the print buffer of FIG. 1.

FIG. 5a is a schematic representation showing the desired location of a character mask within a print buffer.

FIG. 5b is a schematic representation showing the preparation of a bounding box defined in memory.

FIG. 5c is a schematic representation showing the vertical alignment of a character mask within the bounding box of FIG. 5b.

FIG. 5d is a schematic representation showing the horizontal alignment of a character mask within the bounding box of FIG. 5b.

FIG. 6 is the matrix representing a simple character mask for the letter "H" of FIG. 2 showing division of the mask into logical tiles.

FIG. 7 is a tile map of the tiles shown in FIG. 6.

FIG. 8a is a schematic representation of a character mask aligned with a band buffer.

FIG. 8b is a schematic representation of the character mask of FIG. 8a within a bounding box.

FIG. 8c is a schematic representation of the character mask of FIG. 8b indicating the active tiles of the character mask.

DETAILED DESCRIPTION OF THE PREFERRED EMBODIMENTS

Figure 4:
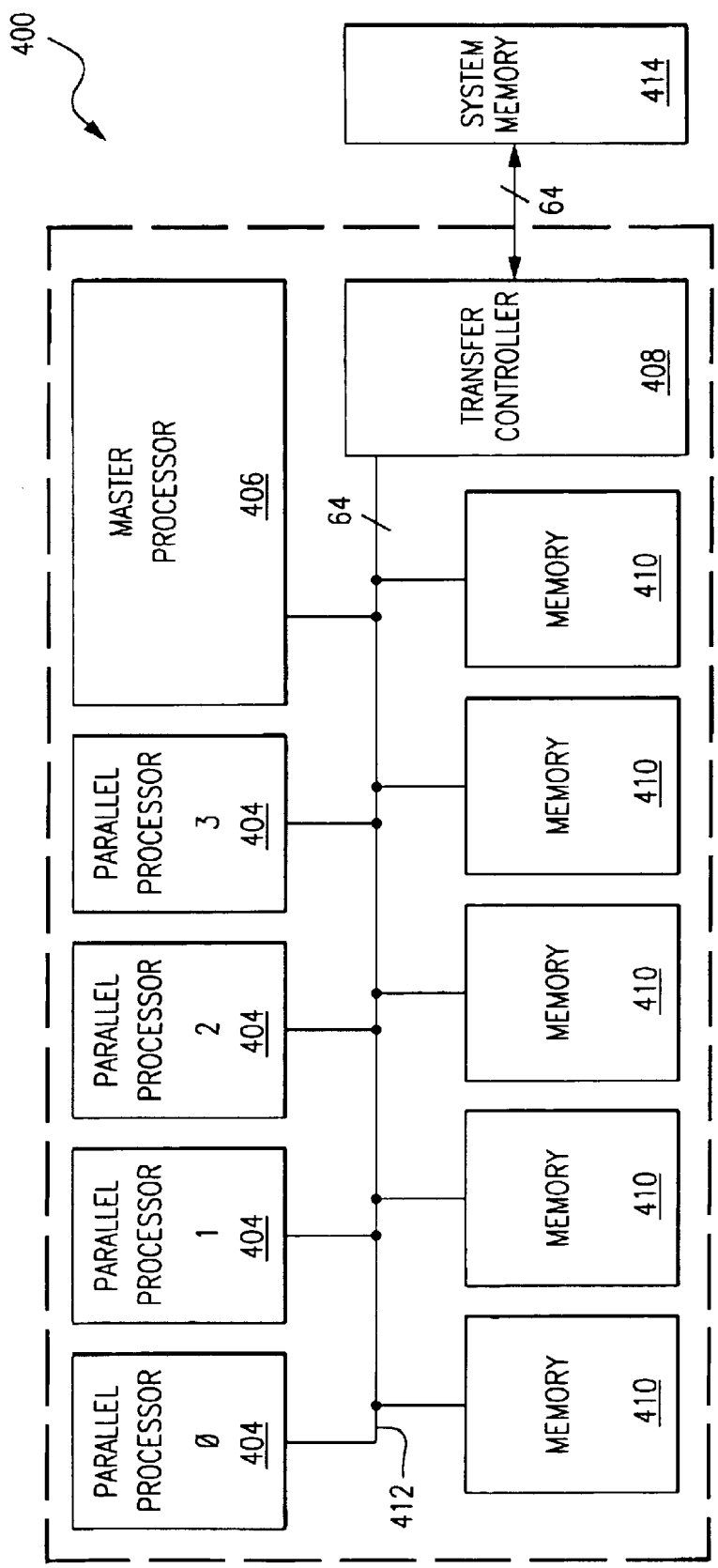
FIG. 4 is a block diagram of a modem multi-processor chip such as the TMS320C80 used to perform the rendering operation shown in FIG. 3.

A new method and system for merging images into a bitmapped printer buffer has been developed. This method, and systems utilizing it, takes advantage of the fact that English characters have very sparsely populated fonts to minimize the amount of data that must be transferred between the printer buffer and the processor chip. Although designed to improve the rendering of text into printer buffers—an extremely common printer function—the throughput improvements are also realized, in certain instances, with non-textual graphics, and display systems.

Printer systems compile, or build, a bitmapped representation of an image to be printed. The bitmapped image is stored in a printer buffer, which is a W×H×D memory array. The memory array holds image data for a W-bit wide by H-bit high pixelated image. The third dimension of the bitmap, or the depth of the image, enables the production of continuous tones, or contones, as well as full-color images.

The process of adding information to the print buffer is called rendering. To render the print buffer means to merge new information with existing information. The print buffer is initially cleared, and image components are then added to the print buffer one by one. For example, a background color and watermark may be added to the print buffer, followed by a graphic image and finally text. The order in which the objects are added generally determines the priority of the image, with the later-added objects overwriting the earlier-added objects. After the print buffer is completed, that is after all of the components of the desired image have been added to the printer buffer, the printer buffer is transferred to circuitry used to form the image held in the printer buffer.

Figure 1:
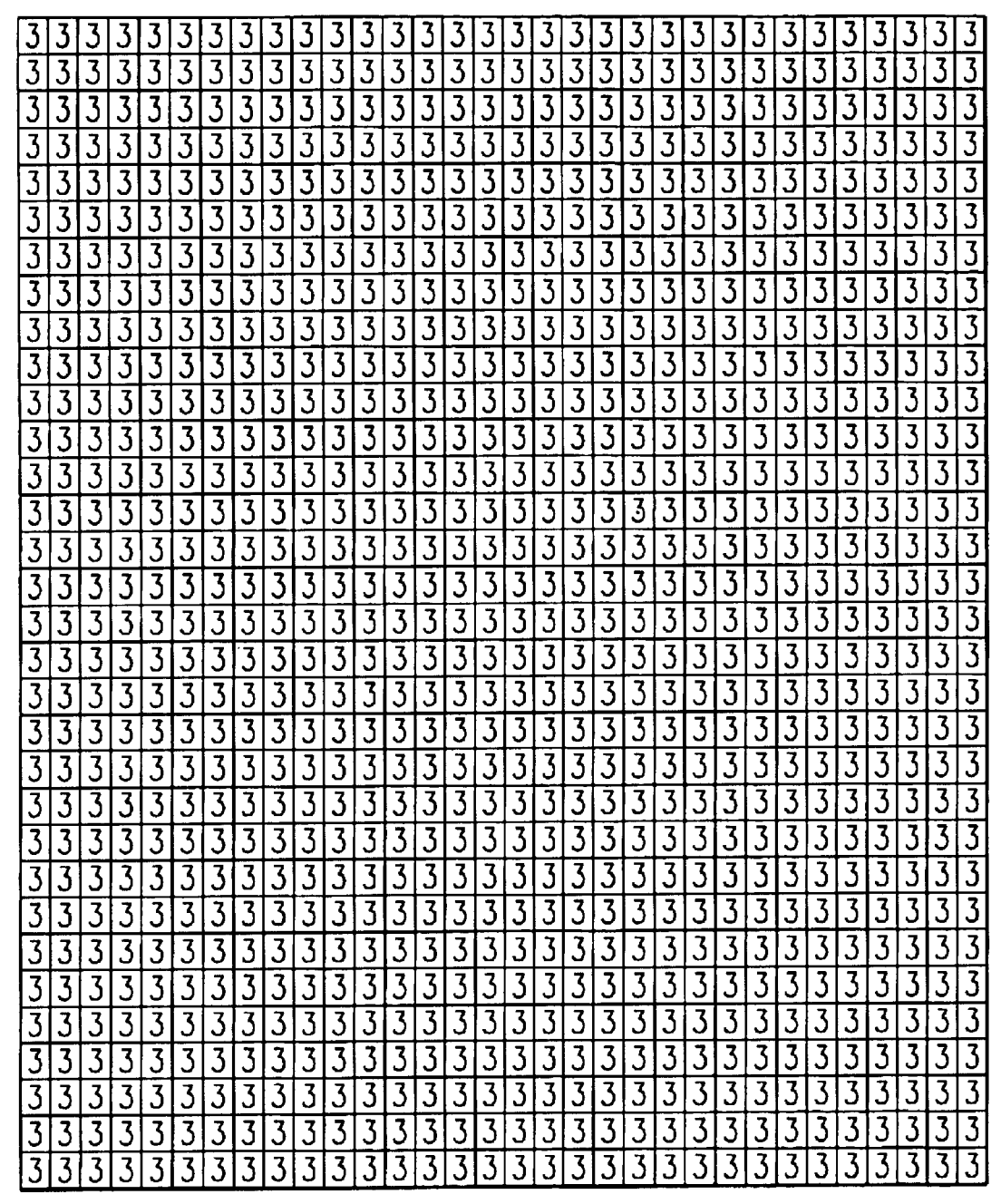
Figure 2:
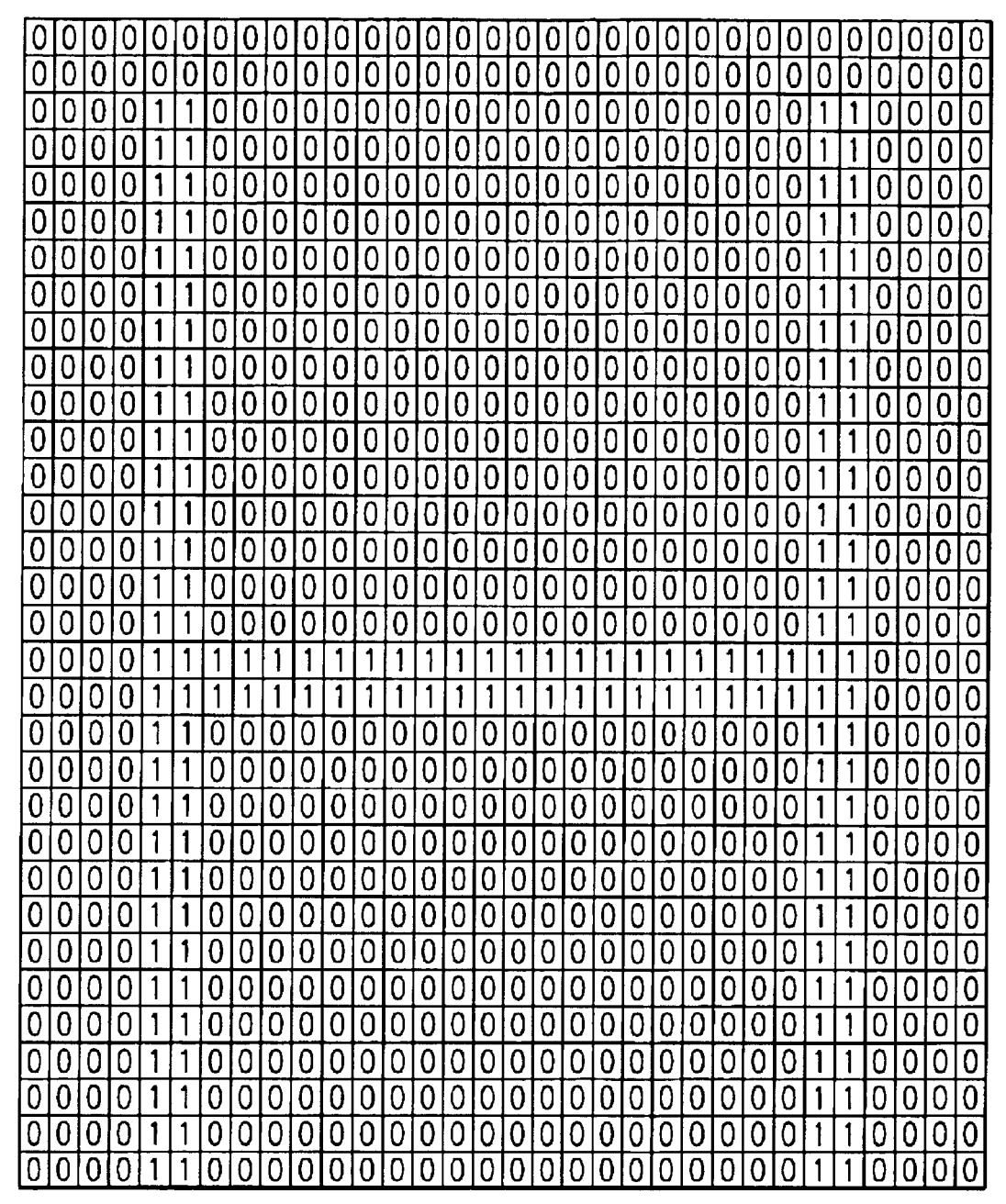
Figure 3:
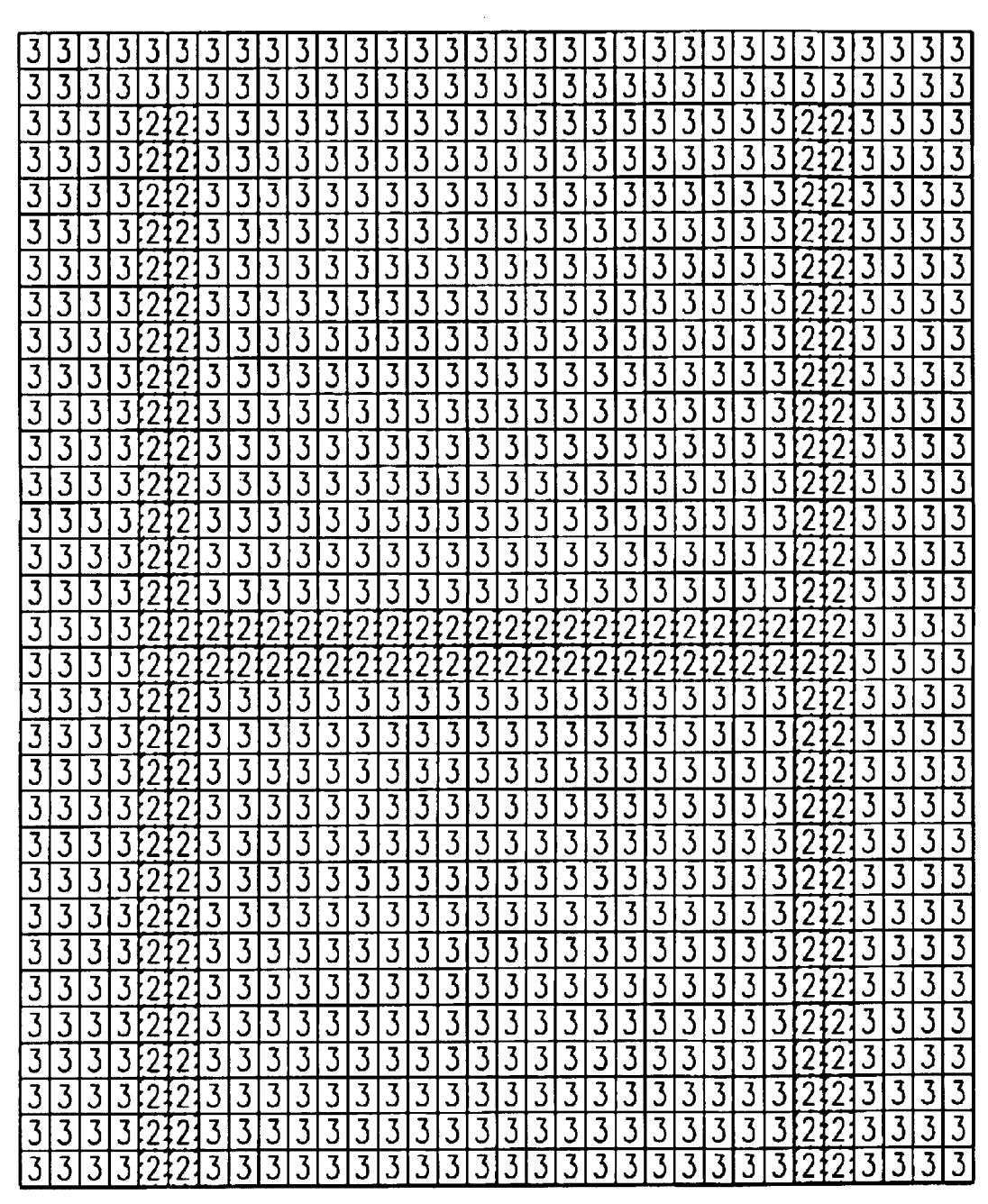

An example of this process is shown in FIGS. 1–3. FIG. 1 is a small portion of a print buffer where each square represents a single pixel. Although the print buffer of FIG. 1 represents a 32×32 array of pixels, it should be understood that a typical print buffer represents a much larger area. For example, a one page print buffer for a 600 dot-per-inch (DPI) printer able to print 8.5×11 inch paper requires a 5100× 6600×D pixel print buffer where D is the depth of the buffer, or the number of bits necessary to generate the required contones and colors. Print buffers are also called band buffers.

The portion of the print buffer 100 shown in FIG. 1 has been loaded with information specifying a background shade—in this example represented by the number three. In order to render a foreground image onto the print buffer 100, the shape of the foreground image must be defined. A mask is used to define the shape of the foreground image.

A mask can be thought of as a stencil, which overlays the background information in the printer buffer. The stencil protects the background while the foreground image is "painted" onto the printer buffer. In digital printing systems, the mask is a one bit per pixel array that extends over the entire region covered by the image to be rendered. While a mask need not be rectangular, rectangular masks are generally easier to process so most masks are rectangular. Depending on the logic polarity chosen—and either polarity is equally acceptable—either a logic "1" or a logic "0" is used to indicate where the foreground object is located. For the purposes of this disclosure a "1" will be used to indicate regions which are to be painted with the foreground color, while a "0" will be used to indicate regions which do not receive the foreground color—that is regions which are "protected" by the stencil.

A foreground image to be rendered into the print buffer is shown by the mask of FIG. 2. The object shown by FIG. 2 is the letter "H" as indicated by the arrangement of 1s and 0s in the mask array. Using the information represented by the mask of FIG. 2, a processor combines a foreground image characteristic, or color, with a background characteristic, or color, stored in the printer buffer according to the formula:

$$\text{print\_buffer} = \text{print\_buffer} \, \& \sim \text{mask} \, | \, \text{foreground} \, \& \, \text{mask}$$

FIG. 3 shows the result of the rendering operation. In FIG. 3, the number 3 represents the background image characteristic while the number 2 represents the foreground image characteristic.

FIG. 4 is a block diagram 400 of a modern multi-processor chip 402 such as the TMS320C80 digital signal processor (DSP) manufactured by Texas Instruments. The TMS320C80, also known as the multimedia video processor (MVP), contains four parallel processors 404, a master processor 406, a transfer controller 408, and five banks of memory 410 as well as a crossbar switch interconnection network 412. Each bank of memory 410 includes space for processor registers, data, and processor instructions. The MVP uses a 64-bit instruction word and a 32-bit data word.

Because the limited memory 410 available on-board processor chips is much less than the memory required by the print buffer, the print buffer is stored in a large off-chip memory bank 414. The portion of the print buffer overlaid by the mask, as well as the mask itself, must be transferred from a large off-chip memory 414 to the on-chip memory 410 accessible by the arithmetic logic units (ALU) of the parallel processors 404. After the mask and portion of the print buffer have been transferred to on-chip memory 410, along with the foreground attributes, the object represented by the mask is rendered onto the print buffer and the portion of the print buffer is transferred back to the off-chip memory 414.

The actual merge operation, as described above, requires each bit of the W×H×D segment of the print buffer to be logical ANDed with the inverse of the mask, and a W×H×D memory segment to be filled with the foreground characteristic and ANDed with the mask. The results from these two AND operations are then logically ORed to obtain the rendered mask.

Although performing the masking operation described above requires a large amount of processing power, high-performance processors such as the MVP are more likely to be limited by transfer bandwidth. Transfer bandwidth is the ability of the processor to transfer information necessary between the on-chip memories 410 and the off-chip memory 414 in which the band buffer is stored.

The invention disclosed herein takes advantage of the fact that typical English characters have sparse masks to reduce the amount of information that must be transferred to and from the on-chip memory banks. In the simplest case, the mask is used to identify and transfer only those pixels in the band buffer that are to receive the foreground color.

A second method of using the mask to reduce the information transferred to and from the band buffer identifies runs, or series, of 1's in the mask and transfers the corresponding sequence of pixels using variable-patch transfers. If the bitmap is already available in run-length encoded form, this approach may be desirable. If the bitmap is not available in run-length encoded form there is processing overhead and storage overhead involved in generating tables, called guide tables, to organize the transfers.

These first two methods could be implemented by programming the processor 402 of FIG. 4 with appropriate instruction codes. These two methods potentially also avoid transferring any of the band buffer to on-chip memory since the foreground color information can be written directly to the off-chip memory.

A third method of reducing the information that must be transferred to and from the processor chip tests the mask a byte at a time. If the byte, which represents 8 pixels, is non-zero, all 8 pixels corresponding to the bits are fetched for masking. If the byte is zero, none of the 8 pixels are transferred. Again, there is processing and storage overhead involved in generating guide tables.

A fourth method of reducing the information transfer load is similar to the above third method, but extends the concept in a second direction. According to this fourth method, the mask—which extends over the entire object to be rendered—is segmented into two-dimensional tiles that are a subset of the mask to be rendered. The tiles are typically rectangular and the size of the tiles is chosen both to efficiently divide the mask, and also to enable the processor to efficiently process the tiles and the portion of the band buffer corresponding to the tiles.

According to this fourth method, if a tile is populated, that is if any of the pixels in the portion of the mask represented by the tile are a logic 1, the portion of the band buffer represented by the tile is fetched from off-chip memory 414 and placed in on-chip memory 410 for masking—again using variable-patch transfers. In order to implement this method, a coarser resolution version of the character mask is generated. This coarser resolution character mask is called a tile map. These tile maps are used to generate guide tables, or lists of offset addresses. Guide tables are used to determine which band buffer tiles to transfer to on-chip memory for the masking operation. The overhead used to compute and store the guide tables according to this method may be lower than the overhead required by the previous method.

Tiling of the band buffer and character masks as discussed above, the logical grouping of the memory locations, may be physical—that is all the pixels in a tile are stored contiguously—or virtual—where the pixels in the tile are not stored contiguously. Physical tiles are converted to normal tiles (linear tiles) using the dimensioned transfer mode of the MVP to turn the corner from tiled memory to linear memory. Physical tiles may reduce transfer times by minimizing page misses. Using virtual tiles, the band buffer is organized linearly in row-major order and a W×H tile is accessed as a two-dimensional patch using the patch transfer mode of the MVP.

Before further discussing the creation of tile maps, the alignment of characters to the band buffer will be discussed. Objects such as characters can be pasted at any location on the band buffer, thus complicating the alignment of the characters to the tiles. FIG. 5 shows the steps taken according to one method of aligning a character, or other object, mask to a tiled band buffer. FIG. 5a shows the desired location of the character mask 502 relative to a portion of the tiled band buffer 504. First, the corner of tile 506 is located by truncating the desired position of the character mask 508 to a tile corner. Tiles covered by the character mask starting with tile 506 will be read into the MVP and masked.

The character mask is also shifted to ease alignment with the tiled band buffer. FIGS. 5b–5d show how the character mask is shifted. First, as shown in FIG. 5b, a bounding box is defined in on-chip memory. The box width shown is a multiple of the processor data word size, in the case of the MVP the data word size is 32 bits. The height of the bounding box is sufficient to hold the character mask regardless of its alignment with the bounding box corner. FIG. 5b shows a bounding box that is four tiles wide and three tiles high. The shaded portion of the bounding box shown in FIG. 5b must be pre-loaded with zeros.

Vertical alignment of the character mask is accomplished by writing the character mask y-rows below the edge of the bounding box. Horizontal alignment is achieved by shifting the character mask the necessary number of bits to the right. The core processing loop required to align the character mask is 2 cycles long. This results in an overhead of 2/32 cycles/pixel for alignment—an insignificant amount compared to the typical font rendering rate of 1/4 cycle/pixel. It is also possible to accomplish this rotation in place, overwriting the original bitmap, if the bounding box region on chip has sufficient padding of zeros on the right.

The following code implements this alignment:

```
/* initialization */
old=0;
rot=32-Dx;
/* loop */
    a=*a_ptr ||*b_ptr=b
new = a \\rot
b = new & %rot|old & ~%rot /*bottom (32-Dx) bits of new and top
Dx bits of old */
old=new;
    The above four cycle core loop can be reduced to two cycles thus:
new=a\\rot||old=new
b=new&%rot|old&~%rot||a=*a_ptr||*b_ptr=b
```

If the character font is byte-aligned, the character mask need not be shifted. In this case, a rectangular box of on-chip memory is defined, with a starting address equal to box_start, a width (box_width) equal to (mask_width/tile_width )*tile_width+tile_width bytes, and a height (box_height) equal to (mask_height/tile_height) * tile_height+tile_height lines. The character mask is transferred on-chip using a dimensionless source (mask_width*mask_height bytes) and a dimensioned destination: A=mask_width, B=mask_height, AB pitch=box_width, C=I, dst start address=box_start+(box_width*vertical_misalignment).

Returning to the discussion of a tile map, it should be understood that each bit of a tile map represents one tile and identifies if there is any active entry in that portion of the character mask. If any pixel in a tile of the character mask is set to 1 the corresponding bit in the tile map is set to 1. FIG. 6 is the character mask of FIG. 2 showing the boundaries of the tiles. FIG. 7 is a tile map representing the character mask of FIG. 6.

To generate the tile maps on a multi-parallel-processor chip such as the MVP, it is efficient to set the tile width equal to either 8, 16, or 32 pixels. These increments correspond to the ALU widths that can be selected on the parallel processors. For example, if the tile width is 8, the ALUs in the parallel processors are set to byte mode. With the 32-bit ALU split four ways, four pixels can be processed simultaneously. Each of the eight rows in the character mask is ORed on a byte by byte basis, and if the result is greater than one the corresponding bit in the tile map is set to 1. The estimated overhead for generating the tile maps is 8+2 cycles for a 32×8 pixel area (assuming four parallel bytes-wise comparisons and two cycles for the comparison to zero)— only 0.04 cycles/pixel. In general the overhead is (tile height+2)/(32*tile height).

The tile map generated above can be used to generate a guide table for a packet transfer that transfers only the relevant tiles from the band buffer to the on-chip memory of the parallel processors. Each entry in the guide table is the relative address of a tile in off-chip memory. The guide table also lists the relative addresses of the corresponding character mask tiles.

The generation of a guide table is explained with reference to FIGS. 8a–8c. In this example, the external memory is assumed to be physically tiled with 8×8 tiles, and the character mask is read onto the processor chip linearly. In FIG. 8a, a character mask is aligned with a band buffer 804. As discussed above and shown in FIG. 8b, a bounding box 806 is defined to facilitate the alignment of the character mask 802 with the band buffer. A tile map is then generated to indicate which tiles in the band buffer must be transferred on-chip. The tiles to be transferred are numbered from 0 through 9 in FIG. 8c. A guide table, shown below as Table 1, is then generated using the following equations:

guide_table=(tile_row*tile_height*band_buffer_width)+(tile_column*tile_width*tile_height) mask_offset=((tile_row*tile_height*mask_width)+(tile_column*tile_width))/8 where tile_row and tile_column are relative to tile 0. If the tile dimensions are chosen to be powers of two, most of the multiplication operations in the above equations are performed as shift operations, greatly reducing the number of cycles necessary to complete the guide table.

TABLE 1

| tile_no | tile_row | tile_column | guide_table | mask_table |
|---------|----------|-------------|-------------|------------|
| 0 | 0 | 0 | 0 | 0 |
| 1 | 1 | 0 | 576 | 576 |
| 2 | 2 | 0 | 1152 | 1152 |
| 3 | 3 | 0 | 1728 | 1728 |
| 4 | 4 | 0 | 2304 | 2304 |
| 5 | 5 | 0 | 2880 | 2880 |
| 6 | 5 | 1 | 2944 | 2888 |
| 7 | 5 | 2 | 3008 | 2896 |
| 8 | 5 | 3 | 3072 | 2904 |
| 9 | 5 | 4 | | |

Because the overhead required to generate the tile map and guide tables is not significant compared to the actual masking operation (0.25 cycles/pixel), the tile maps and guide tables may be generated in real-time as the images are rendered. Generating the tile maps and guide tables in real-time does not require any changes to the industry-standard formats used for storing a font cache.

In case it is desirable, however, to avoid the overhead in calculating tile maps, one can pre-calculate and store them. Since only one bit is used to represent an entire tile, storing the tile map for an 8×8-bit tile is only 1/64 of the tile itself. Unfortunately, as discussed above, a character can be pasted at any arbitrary location on the band buffer. Since the tile map is only valid when a character origin exactly coincides with a tile origin, the tile map must be adjusted to compensate for all possible placements of the character mask.

FIG. 9 shows a method of generating a tile map that subsumes all possible positions a character tile map 904 can assume within a band buffer 902. First, the origin of the mis-aligned character tile map 904 shown in FIG. 9a is aligned to a tile boundary as shown in FIG. 9b. Next, as shown in FIG. 9c, the aligned character tile map is swept one column to the right—adding a tile column. Finally, the resulting tile map is swept down one row_adding a tile row.

Figure 9A:
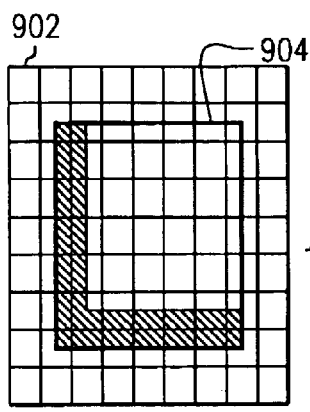
FIG. 9a is a schematic representation of a character mask pasted on a print buffer.
Figure 9B:
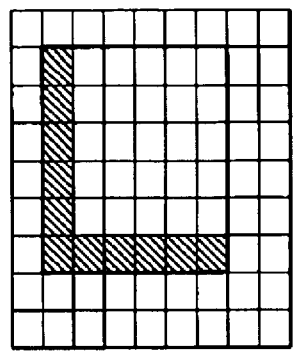
FIG. 9b is a schematic representation of the character mask of FIG. 9a aligned with the tile matrix indicating the active tiles in the character mask.
Figure 9C:
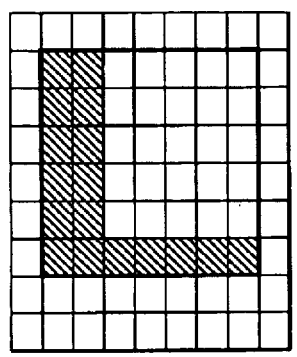
FIG. 9c is a schematic representation of the character mask of FIG. 9b after being swept to the right a full tile.
Figure 9D:
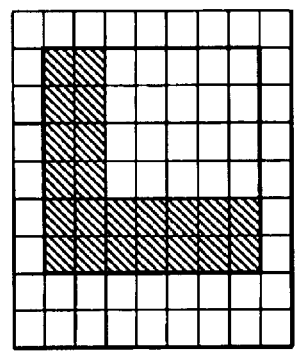
FIG. 9d is a schematic representation of the character mask of FIG. 9c after being swept down a full tile to indicate all possible active tiles for any alignment of the character mask relative to the print buffer tile matrix.

The pre-calculated tile map of FIG. 9d saves the overhead required to realign and calculate the tile map each time it is needed. It potentially does so, however, at the cost of efficiency. This is because some character mask alignments do not require all of the tiles indicated by FIG. 9d to be transferred.

The choice of tile size has a great effect on the efficiency of the disclosed tiling methods. A measure of the efficiency of the methods is indicated by the coverage provided. Coverage is defined as the ratio of the number of pixels transferred with a tile approach—where only active tiles are transferred—to the number of pixels transferred with a non-tiled approach—where all the pixels in the character bounding box are transferred. Smaller coverage numbers are more desirable. In general, smaller tiles provide smaller coverage—but at the expense of larger guide tables and computation overhead.

The following analysis computes the effective coverage with the tiled approach:

1. Ghostscript code is modified to trap the character bitmaps for a particular font.
2. Tile size (tile_width×tile_height) is specified (e.g. 8×8)
3. Assume that the character is out of alignment with the tiles by (tile_width-1, tile_height-1)—the maximum mis-alignment
4. The character is aligned to the tiles and the tile map determined.
5. Active tiles are counted. The number of pixels transferred with tiled approach is equal to the number of active tiles×tile_width×tile_height.
6. Compute the pixels that would be transferred without tiling (but consider that the MVP accesses data in 8 pixel chunks, so the actual pixels transferred can be more than those in the bounding box).
7. Compute the efficiency of the tile approach by dividing the result of step 5 with the result of step 6.
8. Use the probability of letters of the English alphabet as shown in Table 2 to compute the effective coverage for a particular font as the sum for all characters of the probability of a character times the coverage for the character as computed in step 7.

Lower case letter bitmaps are used for analysis. Assume the coverage of the space character is 1.0. The data from Table 2 was obtained from "Digital Image Compression Techniques," by M. Rabbani and P. Jones, as published by SPIE Press, 1991.

TABLE 2

| Symbol | Probability |
|--------|-------------|
| Space | 0.1859 |
| A | 0.0642 |
| B | 0.0127 |
| C | 0.0218 |
| D | 0.0317 |
| E | 0.1031 |
| F | 0.0208 |
| G | 0.0152 |
| H | 0.0467 |
| I | 0.0575 |
| J | 0.0008 |
| K | 0.0049 |
| L | 0.0321 |
| M | 0.0198 |
| N | 0.0574 |
| O | 0.0632 |
| P | 0.0152 |
| Q | 0.0008 |
| R | 0.0484 |
| S | 0.0514 |
| T | 0.0796 |
| U | 0.0228 |
| V | 0.0083 |
| W | 0.0175 |
| X | 0.0013 |
| Y | 0.0164 |
| Z | 0.0005 |

Analysis of the coverage available for 12pt Times-Roman font based on the guidelines above reveals that small tile sizes, e.g. 8×4, are necessary to realize the full potential of the disclosed tiling method. If the band buffer, however, is organized using physical tiles of a different dimension, for example 8×16, the addressing scheme is complicated. In this case, the band buffer is treated as a mixture of physical and logical tiles, in which each physical tile is divided into smaller logical tiles.

Figure 10:
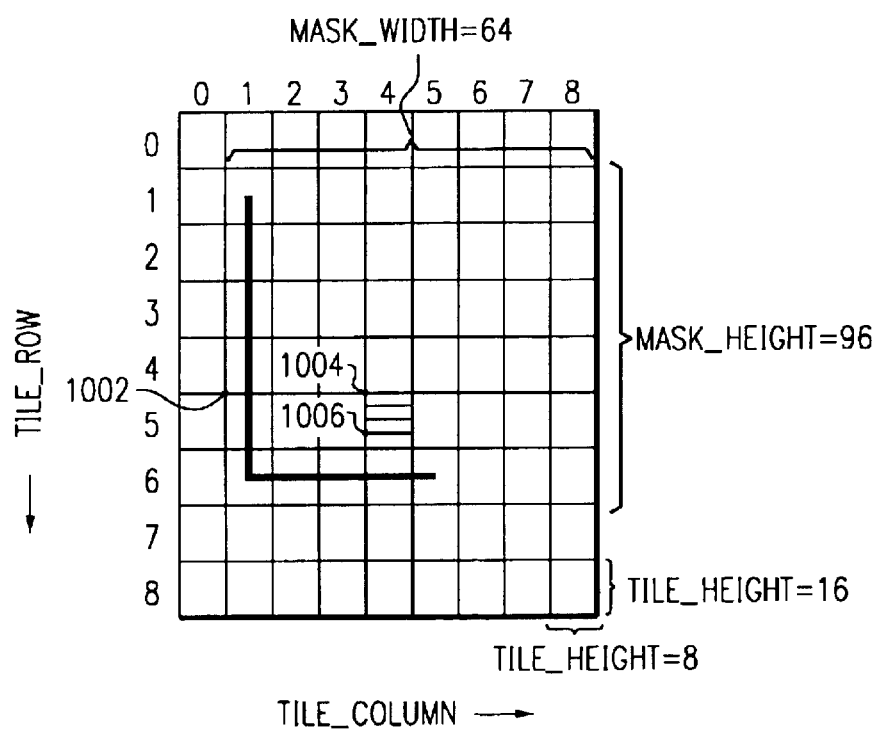
FIG. 10 is a schematic representation of a character mask and a print buffer showing a mixture of physical and logical tiles.

Referring to FIG. 10, the offset for the 8×4tile with its origin at 1006 is computed as follows:

```
(tile_row & %2) * tile_height * band_width +    /* advance to 1002 */
tile_col * tile_width * tile_height +           /* advance to 1004 */
(tile_row & ~%2) * tile_width                   /* advance to 1006 */
```

Figure 11:
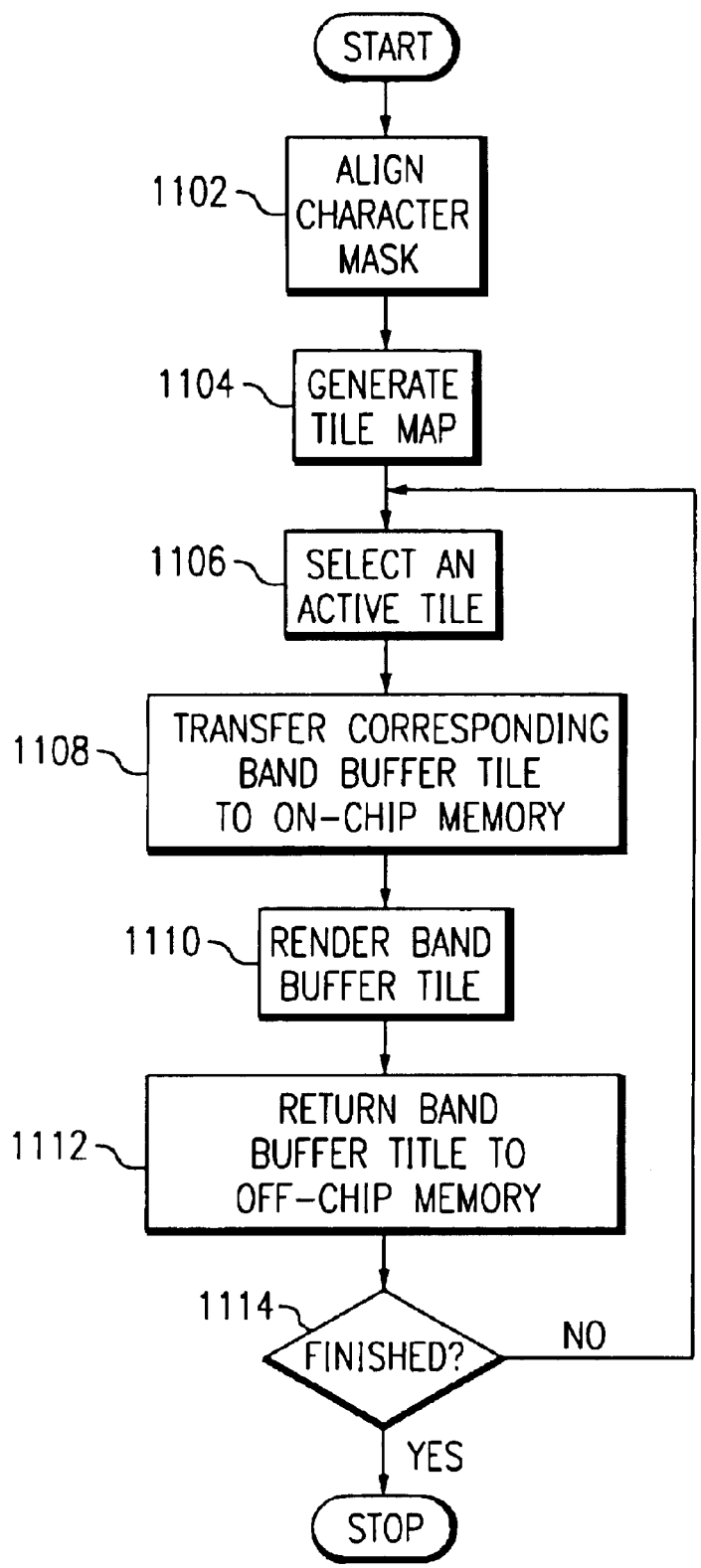
FIG. 11 is a flowchart indicating the major steps involved in rendering a print buffer with an object mask using the tiling methods described herein.

FIG. 11 is a flow chart listing the major steps described above. In summary, block 1102 aligns an object mask, typically a character mask, with a memory tiling arrangement. Block 1104 generates a tile map indicating the active tiles of the character mask. Block 1106 selects an active tile. Block 1108 transfers the corresponding band buffer tile from a first memory, typically an off-chip memory, to a second memory, typically an on-chip memory to allow a processor to render the band buffer tile. Block 1110 renders the band buffer tile. Block 1112 returns the band buffer tile to off-chip memory. Block 1114 check to see if un-rendered active tiles remain and returns control to block 1106 if there are additional active tiles.

Although directed primarily at document printing systems, some display systems also benefit from the application of the disclosed inventive concepts, especially business projectors which are required to overlay a large amount of textual information over background images and textures.

Thus, although there has been disclosed to this point a particular embodiment for efficient buffer rendering, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A method of rendering a buffer, said method comprising the steps of:

providing a band buffer stored in a first memory;

providing an object mask;

subdividing said object mask into tiles, each tile X-pixels wide by Y-pixels high;

locating active tiles in said object mask;

transferring a portion of said band buffer corresponding to said active tiles into a second memory;

modifying said portion of said band buffer based on a portion of said object mask corresponding with said portion of said band buffer; and returning said modified portion of said band buffer to said first memory.

2. The method of claim 1, further comprising the step of:

aligning said object mask with a predetermined tile grid associated with said band buffer.

3. The method of claim 2, said alignment comprising the steps of:

defining a bounding box, said bounding box comprised of an N-row×M-column memory array where N and M are integer multiples of the said tiles;

initializing said bounding box to indicate an empty object mask;

truncating a desired location of said object mask to find a tile corner, said tile corner separated from said desired location in a first vertical and first horizontal direction relative to said bounding box;

copying said object mask into said bounding box at a location horizontally aligned with said tile corner and vertically aligned with said desired location of said object mask;

shifting a portion of said bounding box to horizontally align said object mask to said desired location;

wherein said locating and modifying steps utilize said bounding box in place of said object mask.

4. The method of claim 1, further comprising the step of storing said location of said active tiles in said object mask.

5. The method of claim 1, wherein said modifying step comprises the step of:

setting each pixel in said portion of band buffer equal to: print_buffer & ~mask|foreground & mask; and wherein print_buffer is an initial value of a pixel in said print buffer, mask is a pixel of said object mask, and foreground is a desired value for pixels indicated by said object mask.

* * * * *